US011328693B2

(12) United States Patent
Sun et al.

(10) Patent No.: US 11,328,693 B2
(45) Date of Patent: May 10, 2022

(54) IMAGE DISPLAY DEVICE, METHOD, MEDIUM AND ELECTRONIC DEVICE BASED ON MOBILE TERMINAL

(71) Applicant: BOE TECHNOLOGY GROUP CO., LTD., Beijing (CN)

(72) Inventors: Qimeng Sun, Beijing (CN); Wei Liang, Beijing (CN); Xiaomin Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/976,228

(22) PCT Filed: Jul. 19, 2019

(86) PCT No.: PCT/CN2019/096913
§ 371 (c)(1),
(2) Date: Aug. 27, 2020

(87) PCT Pub. No.: WO2021/012128
PCT Pub. Date: Jan. 28, 2021

(65) Prior Publication Data
US 2021/0020144 A1    Jan. 21, 2021

(51) Int. Cl.
*G09G 5/37*        (2006.01)
*G06F 3/0346*    (2013.01)
*H04B 1/3827*    (2015.01)

(52) U.S. Cl.
CPC .............. *G09G 5/37* (2013.01); *G06F 3/0346* (2013.01); *G09G 2340/145* (2013.01); *G09G 2354/00* (2013.01); *H04B 1/3827* (2013.01)

(58) Field of Classification Search
CPC .................. G09G 5/37; G09G 2354/00; G09G 2340/145; G06F 3/0346; G06F 1/1694;
(Continued)

(56) References Cited

U.S. PATENT DOCUMENTS 8,149,214 B2    4/2012  Cho et al.
8,866,741 B2   10/2014  Cho et al.
(Continued)

FOREIGN PATENT DOCUMENTS

CN    101082837 A    12/2007
CN    102043569 A     5/2011
(Continued)

OTHER PUBLICATIONS

International Search Report and Written Opinion for International Application No. PCT/CN2019/096913 dated Apr. 22, 2020.

*Primary Examiner* — Bryan Earles
(74) *Attorney, Agent, or Firm* — Thomas | Horstemeyer, LLP

(57) ABSTRACT

The present disclosure relates to an image display device, method based on a mobile terminal, medium, and electronic device. The device includes: a rotation angle acquisition processor configured to acquire a rotation angle value of the mobile terminal rotated around an axis in a second direction; a movement speed processor configured to determine a movement speed of an image displayed on a display screen of the mobile terminal in a display interface of the display screen according to the rotation angle value, and/or determine the movement speed of the image in the display interface of the display screen according to a relationship between a size of the image displayed on the display screen in a first direction and a size of the display interface of the display screen in the first direction; and an image movement controller configured to control the image to move in the first direction in the display interface of the display screen according to the movement speed.

13 Claims, 9 Drawing Sheets

(58) Field of Classification Search
CPC ........... G06F 3/0485; G06F 2200/1637; H04B 1/3827
See application file for complete search history.

(56) References Cited

U.S. PATENT DOCUMENTS

| | | | |
|---|---|---|---|
| 9,189,138 B2* | 11/2015 | Aoki | G06F 3/04845 |
| 9,214,128 B2* | 12/2015 | Yamada | G06F 1/1601 |
| 10,579,247 B2* | 3/2020 | Feinstein | H04L 67/02 |
| 2007/0290999 A1 | 12/2007 | Cho et al. | |
| 2012/0154271 A1 | 6/2012 | Cho et al. | |
| 2013/0120240 A1* | 5/2013 | Hong | G06F 3/017 345/156 |
| 2016/0231895 A1* | 8/2016 | Feinstein | E21B 17/1078 |

FOREIGN PATENT DOCUMENTS

| | | |
|---|---|---|
| CN | 109426405 A | 3/2019 |
| EP | 1862921 A1 | 5/2007 |
| EP | 1862921 A1 | 12/2007 |

\* cited by examiner

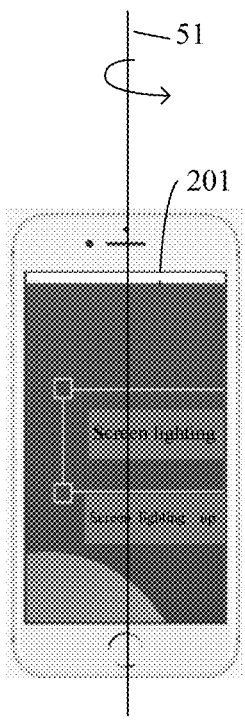

Fig.5

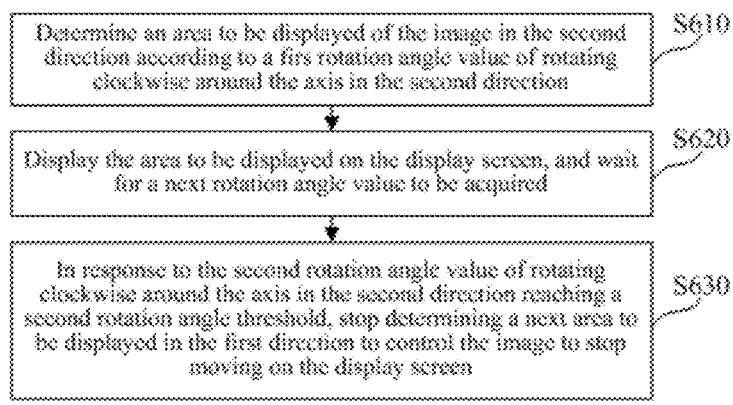

Fig.6

| Determine an area to be displayed in an opposite direction of the first direction of the image according to the second rotation angle value of rotating counterclockwise around the axis in the second direction | S710 |

| Display the area to be displayed on the display screen, and wait for a next rotation angle value to be acquired | S720 |

| In response to receiving the second rotation angle value of rotating counterclockwise around the axis in the second direction, and the display screen displaying an initial area of the image, keep displaying the initial area | S730 |

Fig.7

IMAGE DISPLAY DEVICE, METHOD, MEDIUM AND ELECTRONIC DEVICE BASED ON MOBILE TERMINAL

CROSS-REFERENCE TO RELATED APPLICATION

This application is the § 371 national phase application of International Application No. PCT/CN2019/096913 filed Jul. 19, 2019, where the contents of which are incorporated by reference in their entirety herein.

TECHNICAL FIELD

The present disclosure relates to the field of image display technologies, and in particular, to an image display device based on a mobile terminal, an image display method based on a mobile terminal, and a computer-readable storage medium and an electronic device that implement the image display method based on the mobile terminal.

BACKGROUND

In an office process or leisure and entertainment process, it is increasingly common to view an image through a mobile terminal. However, due to a size of a display screen of the mobile terminal being not large enough or a size of the image to be displayed being too large, a situation that the size of the image exceeds the size of the display screen is often encountered, which is inconvenient for a user to view the image by the mobile terminal.

In the related art, each area of the image is displayed on the display screen by touching and sliding the display screen, so that the user may view the entire content of the image.

However, enjoyment of the image display method in the related art needs to be improved.

It should be noted that the information disclosed in the above Background section is only for enhancing the understanding of the background of the present disclosure, and therefore may include information that does not constitute prior art known to those of ordinary skill in the art.

SUMMARY

An objective of the present disclosure is to provide an image display method based on a mobile terminal, an image display device based on a mobile terminal, and a computer-readable storage medium and an electronic device that implement the image display method based on the mobile terminal.

Other features and advantages of the present disclosure will become apparent through the following detailed description, or partly learned through the practice of the present disclosure.

According to a first aspect of embodiments of the present disclosure, there is provided an image display device based on a mobile terminal, including:

a rotation angle acquisition processor, configured to acquire a rotation angle value of the mobile terminal rotated around an axis in a second direction;

a movement speed processor, configured to determine a movement speed of an image displayed on a display screen of the mobile terminal in a display interface of the display screen according to the rotation angle value, and/or, determine the movement speed of the image in the display interface of the display screen according to a relationship between a size of the image displayed on the display screen in a first direction and a size of the display interface of the display screen in the first direction; and an image movement controller, configured to control the image to move in the first direction in the display interface of the display screen according to the movement speed;

wherein, the first direction and the second direction are substantially perpendicular.

In some embodiments of the present disclosure, based on the foregoing solution, for a case where the movement speed processor is configured to determine the movement speed of the image displayed on the display screen of the mobile terminal in the display interface of the display screen according to the rotation angle value, the movement speed processor is specifically configured to positively correlate the movement speed to the rotation angle value in response to the rotation angle value being less than a first rotation angle threshold.

In some embodiments of the present disclosure, based on the foregoing solution, for a case where the movement speed processor is configured to determine the movement speed of the image in the display interface of the display screen according to the relationship between the size of the image displayed on the display screen in the first direction and the size of the display interface of the display screen in the first direction, the movement speed processor is specifically configured to:

determine the movement speed according to a difference in size between a boundary of the image in the first direction and a boundary of the display interface in the first direction and a second rotation angle threshold.

In some embodiments of the present disclosure, based on the foregoing solution, the movement speed processor is specifically configured to:

determine the movement speed according to a ratio of the difference in size to the second rotation angle threshold.

In some embodiments of the present disclosure, based on the foregoing solution, the image movement controller is specifically configured to:

determine a movement size of the image in the first direction according to the movement speed and the rotation angle value;

determine an area to be displayed of the image in the first direction according to the movement size; and control the image to move in the first direction in the display interface of the display screen, by displaying the area to be displayed on the display screen.

In some embodiments of the present disclosure, based on the foregoing solution, the rotation angle acquisition processor is further configured to: acquire a rotation direction of the mobile terminal around an axis in the second direction;

the image movement controller is further configured to: determine a movement direction of the image according to the rotation direction;

wherein, the rotation direction includes a clockwise direction around the second direction and a counterclockwise direction around the second direction.

In some embodiments of the present disclosure, based on the foregoing solution, the image movement controller is further configured to:

in response to the rotation angle value of rotating around the axis in the second direction reaching the second rotation angle threshold, control the image to stop moving in the first direction in the display interface of the display screen, by stopping determining a next area to be displayed in the first direction.

In some embodiments of the present disclosure, based on the foregoing solution, the size of the image in the first direction is greater than the size of the display interface of the display screen in the first direction, and the image movement controller is further configured to:

in response to the rotation angle value being greater than or equal to the first rotation angle threshold and the rotation direction of the mobile terminal around the axis in the second direction is the clockwise direction, display a second end of the image in the first direction in the display interface; or, in response to the rotation angle value being greater than or equal to the first rotation angle threshold and the rotation direction of the mobile terminal around the axis in the second direction is the counterclockwise direction, display a first end of the image in the first direction in the display interface.

In some embodiments of the present disclosure, based on the foregoing solution, the first direction is parallel to a first side of the display screen, and the second direction is parallel to a second side of the display screen; or, the first direction is parallel to the second side of the display screen, and the second direction is parallel to the first side of the display screen.

In some embodiments of the present disclosure, based on the foregoing solution, the rotation angle acquisition processor is further configured to: acquire a third rotation angle value of the mobile terminal rotated around the axis in a first direction;

the movement speed processor is further specifically configured to: determine a movement speed of the image displayed on the display screen of the mobile terminal in the second direction in the display interface of the display screen according to the third rotation angle value, and/or, determine the movement speed of the image in the second direction in the display interface of the display screen according to a relationship between a size of the image displayed on the display screen in the second direction and a size of the display interface of the display screen in the second direction; and;

the image movement controller is further specifically configured to: control the image to move in the second direction in the display interface of the display screen according to the movement speed in the second direction.

In some embodiments of the present disclosure, based on the foregoing solution, the rotation angle acquisition processor is further configured to: acquire a fourth rotation angle value of the mobile terminal swung around an axis perpendicular to the display screen;

the movement speed processor is further specifically configured to: determine a movement speed of the image displayed on the display screen of the mobile terminal in the display interface of the display screen according to the fourth rotation angle value, and/or, determine the movement speed of the image in the display interface of the display screen according to the relationship between the size of the image displayed on the display screen in the first direction and the size of the display interface of the display screen in the first direction; and the image movement controller is further specifically configured to: control the image to move in the first direction in the display interface of the display screen according to the movement speed.

In some embodiments of the present disclosure, based on the foregoing solution, the device further includes:

an instruction generator, configured to: in response to the image being controlled to move in the display interface of the display screen by the image movement controller, generate an instruction for controlling a display terminal to display the image.

In some embodiments of the present disclosure, based on the foregoing solution, the instruction includes information of a current image area displayed in the display interface of the display screen, so that the current image area is displayed by the display terminal.

In some embodiments of the present disclosure, based on the foregoing solution, the instruction is configured to control the image displayed in the display terminal to move in the first direction.

According to a second aspect of the embodiments of the present disclosure, an image display method based on a mobile terminal is provided. The method includes:

acquiring a rotation angle value of the mobile terminal rotated around an axis in a second direction;

determining a movement speed of an image displayed on a display screen of the mobile terminal in a display interface of the display screen according to the rotation angle value, and/or, determining the movement speed of the image in the display interface of the display screen according to a relationship between a size of the image displayed on the display screen in a first direction and a size of the display interface of the display screen in the first direction; and controlling the image to move in the first direction in the display interface of the display screen according to the movement speed;

wherein, the first direction and the second direction are substantially perpendicular.

In some embodiments of the present disclosure, based on the foregoing solution, the step of determining a movement speed of an image displayed on a display screen of the mobile terminal in a display interface of the display screen according to the rotation angle value includes:

positively correlating the movement speed to the rotation angle value in response to the rotation angle value being less than a first rotation angle threshold.

In some embodiments of the present disclosure, based on the foregoing solution, the step of determining the movement speed of the image in the display interface of the display screen according to a relationship between a size of the image displayed on the display screen in a first direction and a size of the display interface of the display screen in the first direction includes:

determining the movement speed according to a difference in size between a boundary of the image in the first direction and a boundary of the display interface in the first direction and a second rotation angle threshold.

In some embodiments of the present disclosure, based on the foregoing solution, the determining the movement speed according to the difference in size between the boundary of the image in the first direction and the boundary of the display interface in the first direction and the second rotation angle threshold, includes:

determining the movement speed according to a ratio of the difference in size to the second rotation angle threshold.

In some embodiments of the present disclosure, based on the foregoing solution, the method further includes:

in response to the controlling the image to move in the display interface of the display screen, generating an instruction for controlling a display terminal to display the image.

According to a third aspect of the embodiments of the present disclosure, there is provided an electronic device, including:

a processor; and a memory, configured to store executable instructions of the processor;

wherein, the processor is configured to execute steps of the method in any one of the embodiments of the second aspect above by executing the executable instructions.

According to a fourth aspect of an embodiment of the present disclosure, there is provided a non-transitory computer-readable storage medium on which a computer program is stored, which when executed by a processor implements steps of the method in any one of the embodiments of the second aspect above.

It should be understood that the above general description and the following detailed description are only exemplary and explanatory, and do not limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Understandably, the drawings in the following description are only some embodiments of the present disclosure, and those of ordinary skill in the art can acquire other drawings based on these drawings without creative efforts.

FIG. 5 schematically shows a usage scenario diagram according to another embodiment of the present disclosure;

FIG. 6 schematically shows a flowchart of an image display method based on a mobile terminal according to another exemplary embodiment of the present disclosure;

FIG. 7 schematically shows a flowchart of an image display method based on a mobile terminal according to yet another exemplary embodiment of the present disclosure;

DETAILED DESCRIPTION

Figure 1:
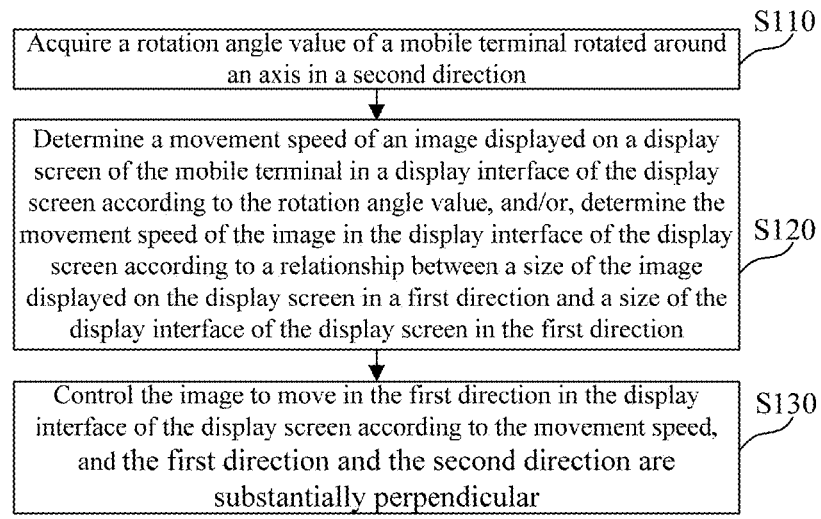
FIG. 1 schematically shows a flowchart of an image display method based on a mobile terminal according to an exemplary embodiment of the present disclosure.

Example embodiments will now be described more fully with reference to the drawings. However, the example embodiments can be implemented in various forms, and should not be construed as being limited to the examples set forth herein; rather, providing these embodiments makes the present disclosure more comprehensive and complete, and fully conveys the concept of example embodiments to those skilled in the art. The described features, structures, or characteristics may be combined in one or more embodiments in any suitable manner.

In addition, the drawings are only schematic illustrations of the present disclosure and are not necessarily drawn to scale. The same reference numerals in the drawings denote the same or similar parts, and thus their repeated description will be omitted. Some of the block diagrams shown in the drawings are functional entities and do not necessarily have to correspond to physically or logically independent entities. These functional entities may be implemented in the form of software, or implemented in one or more hardware modules or integrated circuits, or implemented in different networks and/or processor devices and/or microcontroller devices.

The block diagrams shown in the drawings are merely functional entities and do not necessarily have to correspond to physically independent entities. That is, these functional entities may be implemented in the form of software, or implemented in one or more hardware modules or integrated circuits, or implemented in different networks and/or processor devices and/or microcontroller devices.

The flowchart shown in the drawings is only an exemplary description, and it is not necessary to include all contents and operations/steps, nor to be executed in the order described. For example, some operations/steps may also be decomposed, and some operations/steps may be merged or partially merged, so the order of actual execution may change according to the actual situation.

It should be noted that although the various steps of the method in the present disclosure are described in a specific order in the drawings, this does not require or imply that the steps must be performed in the specific order, or all the steps shown must be performed to achieve the desired result. Additionally or alternatively, certain steps may be omitted, multiple steps may be combined into one step for execution, and/or one step may be decomposed into multiple steps for execution, etc. In addition, for example, it is understood that these steps may be performed synchronously or asynchronously in multiple modules/processes/threads.

An example embodiment first provides an image display method based on a mobile terminal. FIG. 1 schematically shows a flowchart of an image display method based on a mobile terminal according to an exemplary embodiment of the present disclosure, which at least to a certain extent enhances enjoyment of the image display of the mobile terminal.

An execution subject of the image display method based on the mobile terminal provided in this embodiment may be a device with a calculation processing function, such as a server and the like. In this embodiment, the above execution subject is explained by taking an image display device based on a mobile terminal as an example.

Referring to FIG. 1, the method may include the following steps:

in step S110, a rotation angle value of the mobile terminal rotated around an axis in a second direction is acquired;

in step S120, a movement speed of an image displayed on a display screen of the mobile terminal in a display interface of the display screen is determined according to the rotation angle value, and/or, the movement speed of the image in the display interface of the display screen is determined according to a relationship between a size of the image displayed on the display screen in a first direction and a size of the display interface of the display screen in the first direction; and In step S130, the image is controlled to move in the first direction in the display interface of the display screen according to the movement speed.

In the technical solution provided by the embodiment shown in FIG. 1, the rotation angle value of the mobile terminal rotated around the axis in the second direction is acquired, and the movement speed of the image displayed on the display screen of the mobile terminal in the display interface of the display screen is determined according to the rotation angle value, and/or, the movement speed of the image in the display interface of the display screen is determined according to the relationship between the size of the image displayed on the display screen in the first direction and the size of the display interface of the display screen in the first direction. Further, according to the movement speed, the image is controlled to move in the first direction in the display interface of the display screen. In this technical solution, image content is acquired by rotating the mobile terminal, so that the image in the display interface moves as the mobile terminal is rotated, thereby providing a user with a way of somatosensory image browsing, thereby enhancing the enjoyment of image display.

In some embodiments of the present disclosure, the mobile terminal refers to a terminal device having a display screen, such as, a mobile phone, a notebook, a tablet computer, and a POS machine. The following embodiments may use the mobile phone as an example to describe specific implementations of the technical solution.

In some embodiments, an exemplary usage scenario of the technical solution is introduced first.

In some embodiments, the somatosensory image browsing scheme provided by this embodiment is applicable to images of various sizes, including: an image of which a size is greater than the size of the display screen in the first direction, an image of which a size is equal to the size of the display screen in the first direction and an image of which a size is smaller than the size of the display screen in the first direction. Specifically, for a case where the size of the image is greater than the size of the display screen in the first direction, the image moves following the rotation of the mobile terminal around a direction parallel to the second direction, for example, an image area not to be displayed is displayed extendedly in the first direction. For a case where the size of the image is smaller than the size of the display screen in the first direction, the image moves following the rotation of the mobile terminal around the direction parallel to the second direction, for example, the image translates in the first direction on the display screen. For a case where the size of the image is the same as the size of the display screen in the first direction, the image does not move following the rotation of the mobile terminal around the direction parallel to the second direction.

Figure 2:
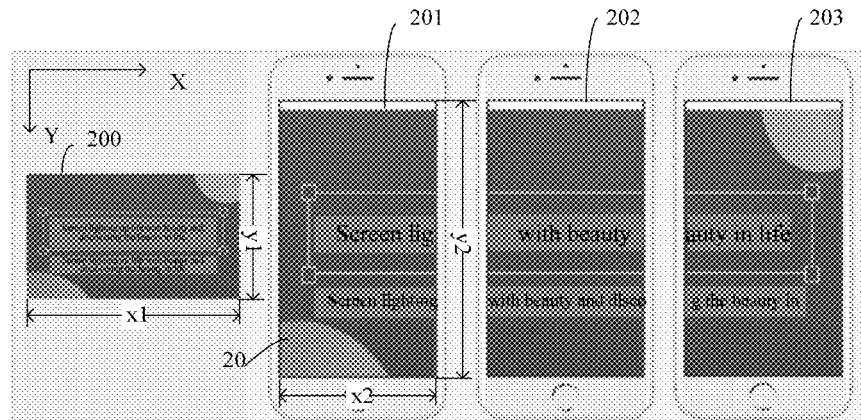
FIG. 2 schematically shows a usage scenario diagram according to an embodiment of the present disclosure.

Exemplarily, FIG. 2 shows a schematic diagram of a usage scenario according to an embodiment of the present disclosure. Referring to FIG. 2, size information of an image 200 is: [x1 (in an X-axis direction), y1 (in a Y-axis direction)], and size information of a display screen 20 of the mobile terminal (a mobile phone) is: [x2 (a first side), y2 (a second side)]. When the image 200 is displayed on the display screen 20 of the mobile phone in a manner shown in FIG. 2, since a size x2 of the first side of the display interface of the display screen 20 is smaller than a size x1 of the image 200 in the X-axis direction, according to the somatosensory image browsing scheme provided by this embodiment, the mobile phone may be rotated around an axis parallel to the second side of the display screen, and the image may be extended with more details of the image following the rotation of the mobile phone, so that it is achieved that various areas of the image 200 may be viewed.

Figure 3:
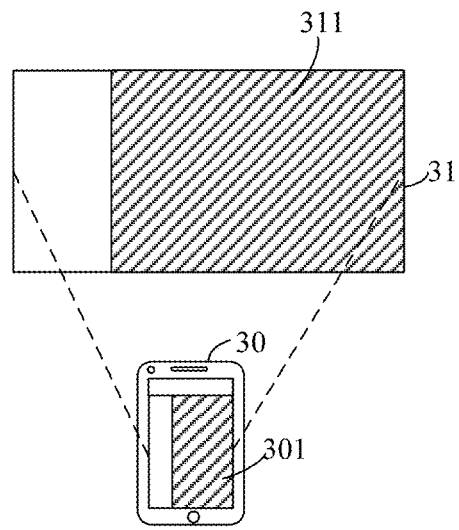
FIG. 3 schematically shows a usage scenario diagram according to another embodiment of the present disclosure.

Exemplarily, FIG. 3 shows a schematic diagram of another usage scenario according to an embodiment of the present disclosure. According to the embodiment shown in FIG. 2 and referring to FIG. 3, by rotating the mobile terminal (a mobile phone 30) around the axis parallel to the second side of the display screen, the image 200 may be extended with more details of the image following the rotation of the mobile phone 30. For example, a current image area 301 is displayed on the display screen of the mobile phone 30. In order to facilitate the user's browsing, the current image area 301 displayed on the mobile phone 30 may also be sent to another display terminal, such as a paint plate terminal 31, so that a corresponding image area 311 is also displayed in the paint plate terminal 31. This embodiment synchronizes the image moving on the display screen of the mobile terminal to another terminal, thereby providing the user with a way of somatosensory image browsing by the paint plate terminal 31.

Specific implementations of each step of the embodiment shown in FIG. 1 will be described in more detail in conjunction with an image display device 400 based on a mobile terminal.

In an exemplary embodiment, in the step S110, the rotation angle value of the mobile terminal rotated around the axis in the second direction is acquired by a rotation angle acquisition processor 401s. Exemplarily, the rotation angle acquisition processor 401 may be a gyroscope, an acceleration sensor, or the like.

In this embodiment, a rectangular display screen (specifically, the above first side is referred to as a short side of the display screen in following embodiments, and the above second side is referred to as a long side of the display screen in the following embodiments) is taken as an example for related description. For a square display screen, the long side of the display screen and the short side of the display screen correspond to "a first side of the square display screen" and "a second side of the square display screen" that intersects with the first side. Therefore, in following embodiments, the square display screen will not be described separately. In the following embodiments, the second direction is parallel to the long side of the display screen.

In an exemplary embodiment, in response to the display screen of the mobile terminal displaying an image with a first size in the first direction greater than a first threshold, the gyroscope and the acceleration sensor are triggered to acquire the rotation angle value of the mobile terminal rotated around the axis in the second direction. Exemplarily, the gyroscope and the acceleration sensor may be arranged at positions inside the mobile phone near a center of the display screen together, so as to improve accuracy of an image display area by improving accuracy of measured rotation angle values. An included angle between the first direction and the second direction is in a range of [90−l, 90+j] degrees, where l and j are both small positive values, for example, 5 or 10.

Exemplarily, referring to FIG. 2, when the size x1 (that is, the first size) of the image 200 displayed on the display screen 20 in the X-axis direction is greater than the size x2 of the short side of the display screen, the gyroscope and the acceleration sensor are triggered to acquire the rotation angle value of the mobile terminal rotated around an axis (an axis 51 shown in FIG. 5) parallel to the long side direction. Further, an image area dynamically displayed on the display screen is finally determined based on the rotation angle value of rotating around the axis 51, thereby achieving a purpose of displaying the entire image 200 in a divided area manner, which brings the user a browsing effect that the image moves on the display screen, and enhances the enjoyment of the image display by providing the somatosensory image browsing.

In an exemplary embodiment, in order to avoid that the rotation angle value of the mobile terminal is too large to affect the user's experience of viewing the display screen, the technical solution sets a rotation angle threshold. Exemplarily, the rotation angle threshold may be set to an angle value not greater than 45 degrees.

In an exemplary embodiment, in the step S120, the movement speed of the image in the display interface of the display screen is determined, by a movement speed processor 402, according to the rotation angle value and/or the movement speed of the image in the display interface of the display screen is determined, by a movement speed processor 402, according to the relationship between the size of the image in the first direction and the size of the display interface of the display screen in the first direction. It can be seen that the technical solution provides various ways to determine the movement speed of the image. Specifically, the following specific implementations are included.

In a specific implementation, the movement speed of the image in the display interface of the display screen is determined according to the rotation angle value. In this embodiment, a "first rotation angle value" represents the rotation angle value used to determine the movement speed. When the "first rotation angle value" is within a range of a "first rotation angle threshold", the "first rotation angle value" is used to determine the movement speed of the image. When the "first rotation angle value" is greater than the "first rotation angle threshold", a leftmost or rightmost end of the image is displayed on the display screen.

As an example, in response to the first rotation angle value being less than the first rotation angle threshold, the movement speed of the image in the display interface of the display screen is positively related to the first rotation angle value. Referring to FIG. 5, when the first rotation angle value around the axis 51 is larger, the image moves faster on the display screen. In contrast, when the first rotation angle value around the axis 51 is smaller, the image moves slower on the display screen. Specifically, a relationship between the first rotation angle value and the movement speed of the image may be a linear relationship and a non-linear relationship. The user controls the movement speed of the image by adjusting the rotation angle value of the mobile terminal, so that the user may manually control the movement speed of the image according to different needs to improves somatosensory browsing experience.

Exemplarily, when the first rotation angle value is greater than or equal to the first rotation angle threshold, one end of the image 200 is directly displayed on the display screen. Specifically, when the first rotation angle value is greater than or equal to the first rotation angle threshold and the rotation direction of the mobile terminal around the axis 51 is clockwise, a rightmost end of the image 200 in the X-axis direction is displayed in the display interface. When the first rotation angle value is greater than or equal to the first rotation angle threshold and the rotation direction of the mobile terminal around an axis 81 is counterclockwise, a leftmost end of the image 200 in the X-axis direction is displayed in the display interface. Therefore, the user may conveniently view a certain end of the image through the rotation angle value greater than the first rotation angle threshold, thereby saving time taken by image movement, and further improving the user's image browsing experience.

In another specific implementation, the movement speed of the image in the display interface of the display screen is determined according to the relationship between the size of the image in the first direction and the size of the display interface of the display screen in the first direction.

In the specific implementation, referring to FIGS. 2 and 5, according to a difference h1 (i.e., h1=x1−x2) in size between a boundary x1 of the image 200 in the first direction and a boundary x2 of the display interface in the first direction and a second rotation angle threshold, the movement speed of the image in the first direction in the display interface is determined when the mobile terminal is rotated around the axis 51.

Exemplarily, the second rotation angle threshold represents a maximum value of rotating the mobile phone around the axis 51, and the value is $\alpha$. According to a ratio of the difference in size to the second rotation angle threshold, the specific implementation for determining the movement speed may be: the movement speed $\lambda 1$ is $(h1/\alpha)$, which means that the display screen 20 of the mobile phone is rotated by 1 degree around the axis 51, and the image 200 moves $(h1/\alpha)$ in a direction of the short side of the display screen 20. In this embodiment, the movement speed of the image is automatically adjusted according to the size of the image, which is convenient for the user to view the complete image. When the size of the image is larger, the movement speed of the image is automatically adjusted to be faster to prevent the user from browsing for too long, so as to improve the user's somatosensory image browsing experience.

In still another specific implementation, according to the rotation angle value acquired in the step S110 (a first aspect), and according to the relationship between the size of the image in the first direction and the size of the display interface of the display screen (a second aspect), the movement speed of the image in the display interface of the display screen is determined by both the first aspect and the second aspect. Specifically, a final movement speed of the image may be determined by weighting and summing sub-movement speeds determined by each aspect.

In an exemplary embodiment, in the step S130, the image is controlled to move in the first direction in the display interface of the display screen, by an image movement controller 403, according to the movement speed.

In an embodiment, in a case where the movement speed of the image is determined according to the difference in size and the second rotation angle threshold, a movement size of the image in the first direction is determined, by a movement size processing module 4031, according to the movement speed and the rotation angle value; an area to be displayed of the image in the first direction is determined, by an area to be displayed determination module 4032, according to the movement size; and the image is controlled to move in the first direction in the display interface of the display screen by displaying the area to be displayed on the display screen by an image movement control module 4033.

Specifically, as the mobile terminal is rotated around the axis 51, the rotation angle values are acquired multiple times, for example, acquired every second. A corresponding movement size is determined for each rotation angle value, and a plurality of areas to be displayed of the image 200 in the X-axis direction are determined according to the corresponding movement size of each rotation angle value. Further, a technical effect of the image moving on the display screen is realized by sequentially displaying the plurality of areas to be displayed on the display screen. For example, referring to FIG. 2, if the current display area in the display interface is an initial area 201 of the image 200, the rotation angle value is acquired twice as the mobile terminal is rotated around the axis 51. One movement size is determined according to the rotation angle value acquired for the first time, and further, the area to be displayed is determined as a middle area 202 according to this movement size, and the middle area 202 is to be displayed. One movement size is determined according to the rotation angle value acquired for the second time, and further, the area to be displayed is determined as a last area (i.e., a rightmost area 203) of the image 200 according to this movement size, and the rightmost area 203 is to be displayed. Thus, the movement effect of the image on the display screen is achieved by displaying the image 200 in the divided-area manner on the display screen.

In the above embodiment, the image is controlled to move in a set direction according to the rotation direction, which is convenient for the user to manually control the image to move in a required direction according to actual needs, thereby providing the user a simple and convenient way of somatosensory image browsing.

In an exemplary embodiment, the rotation angle acquisition processor 401 is further configured to: acquire a rotation direction of the mobile terminal around the axis in the second direction; and, the image movement controller 403 is further configured to: determine a movement direction of the image based on the rotation direction. The rotation direction includes a clockwise direction around the second direction and a counterclockwise direction around the second direction. Specifically, the following detailed description will be made by the embodiments shown in FIG. 6 and FIG. 7, respectively:

Exemplarily, FIG. 6 schematically shows a flowchart of an image display method based on a mobile terminal according to another exemplary embodiment of the present disclosure, specifically, which is a specific implementation of the image display method in a clockwise direction around the axis 51 case. Referring to FIG. 6, the method provided in this embodiment includes steps S610 to S630.

In the step S610, an area to be displayed of the image in the first direction is determined according to a second rotation angle value of rotating clockwise around the axis in the second direction.

In an exemplary embodiment, referring to FIG. 5, the mobile phone is rotated a certain angle clockwise around the axis 51 (that is, the above-mentioned second rotation angle value), and then a movement size is determined. Further, the area to be displayed of the image 200 in a positive X-axis direction is determined according to the movement size. Exemplarily, when the second rotation angle value in a case where the rotation is clockwise is s, a size of the area to be displayed of the image 200 in the positive X-axis direction is $s*\lambda1$.

In the step S620, the area to be displayed is displayed on the display screen, and a next rotation angle value is waited for to be acquired.

The above embodiment is still taken as an example for description. Referring to FIG. 2, before the mobile phone is rotated, the image area displayed on the display screen 20 is the initial area 201. After the mobile phone is rotated clockwise around the axis 51 by an angle s, the area to be displayed is determined as the middle area 202. Thus, the user may view another area of the image 200 by rotating the mobile phone.

In the step S630, in response to the second rotation angle value of rotating clockwise around the axis in the second direction reaching the second rotation angle threshold, determining a next area to be displayed in the first direction (i.e., the positive X-axis direction) is stopped to control the image to stop moving on the display screen.

In the exemplary embodiment, when the rotation angle value of rotating clockwise around the axis 51 reaches the second rotation angle threshold, at this time, the display screen 20 displays the last area (i.e., the rightmost area 203) of the image 200 in the first direction. Therefore, the rotation angle value of the mobile phone around the axis 51 in the clockwise direction is no longer acquired, and determination of the next display area in the first direction is stopped, so that it is achieved to control the image 200 to stop moving on the display screen.

Exemplarily, FIG. 7 schematically shows a flowchart of an image display method based on a mobile terminal according to still another exemplary embodiment of the present disclosure, specifically, which is a specific implementation of the image display method in a counterclockwise direction around the axis 51 case. A difference from the embodiment shown in FIG. 6 is that the rotation direction of the mobile terminal around the axis 51 is opposite.

Referring to FIG. 7, the method provided in this embodiment includes steps S710 to S730.

In the step S710, the area to be displayed of the image in an opposite direction of the first direction is determined according to the second rotation angle value of rotating counterclockwise around the axis in the second direction.

Figure 8:
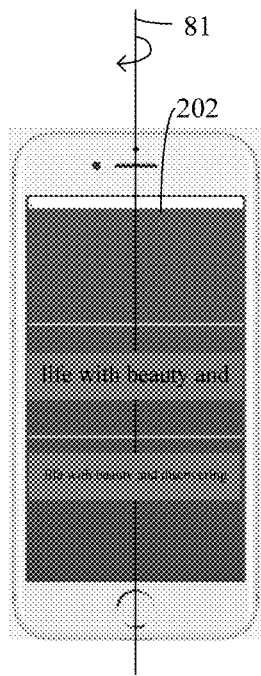
FIG. 8 schematically shows a usage scenario diagram according to yet another embodiment of the present disclosure.

In an exemplary embodiment, referring to FIG. 8, when the mobile phone is rotated counterclockwise around the axis 81 (around an axis parallel to a direction of the long side) by a certain angle, the area to be displayed of the image 200 is determined in a negative X-axis direction. Exemplarily, the second rotation angle in a case where the rotation is counterclockwise is m, the size of the area to be displayed of the image 200 in the negative direction of X-axis is $m*\lambda1$.

In the step S720, the area to be displayed is displayed on the display screen, and a next rotation angle value is waited for to be acquired.

The above embodiment is still taken as an example for description. Referring to FIG. 2, when the middle area 202 is displayed on the display screen 20, after an angle m is rotated counterclockwise around the axis 81 as shown in FIG. 8, the area to be displayed is determined as the initial region 201. Thus, the user may view each area of the image repeatedly by rotating the mobile phone back and forth.

In the step S730, in response to receiving the second rotation angle value of rotating counterclockwise around the axis in the second direction, and when the display screen displays the initial area of the image, the initial area is kept displaying.

In an exemplary embodiment, with continued reference to FIG. 8, if the rotation angle value of rotating counterclockwise around the axis 81 is received, and the initial area 201 of the image is currently displayed on the display screen, it means that the leftmost area of the image has been displayed at this time, and even though the mobile terminal continues to be rotated counterclockwise around the axis 81, the image on the display screen will not change. Therefore, the initial area is kept displaying and the determination of the next area to be displayed in the second direction (that is, in the negative X-axis direction) is stopped, to control the image to stop moving on the display screen.

In the embodiments shown in FIGS. 6 and 7, the determination of the area of the image to be displayed when the mobile phone is rotated clockwise/counterclockwise around the axis parallel to the long side of the mobile phone (around the axis in the second direction) and conditions for stopping the determination of the next display area are introduced, respectively. Therefore, through the embodiments shown in FIGS. 6 and 7, the image of which the size in the X-axis direction (refer to FIG. 2) is greater than the size of the short side of the display screen may be viewed by rotating the mobile phone. With the image display method provided in this embodiment, the user does not need to actively perform any traditional touch operation on the mobile phone, and may view the image beyond the display screen by simply rotating the mobile phone device.

Figure 9:
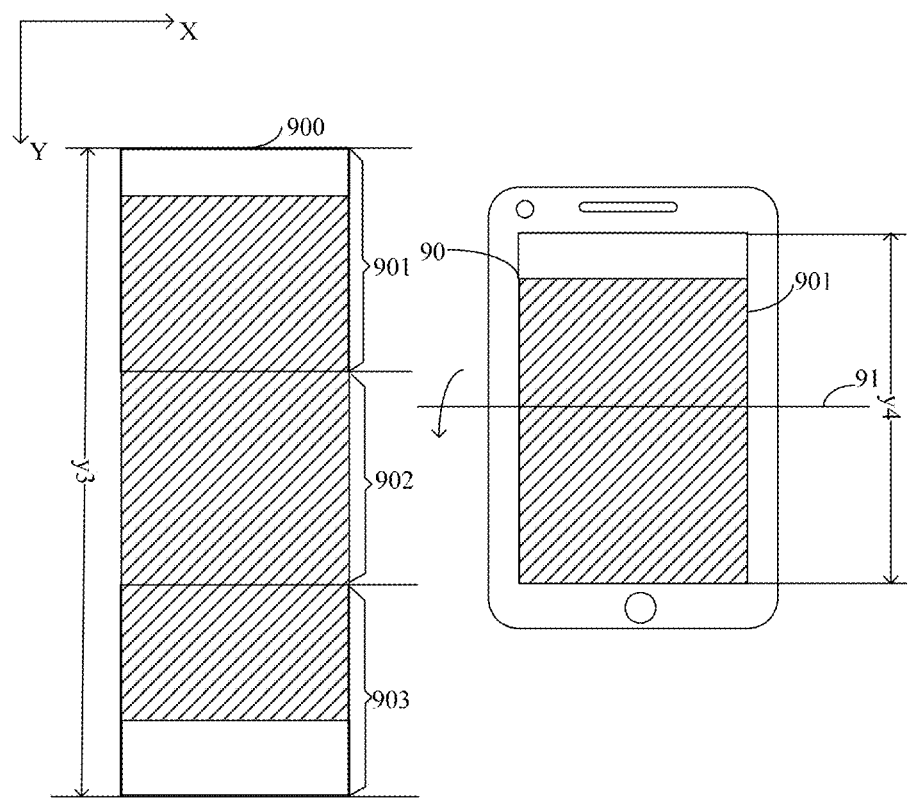
FIG. 9 schematically shows a usage scenario diagram according to yet another embodiment of the present disclosure.

The above embodiment provides the image display method for a case where the image exceeds the size of the display screen of the mobile terminal in one direction (refer to FIG. 2 in the X-axis direction or the Y-axis direction). Referring to FIG. 9, in the following embodiments, the image display method is adopted when an image 900 exceeds the size of the display screen of the mobile terminal in both directions (the X-axis direction and the Y-axis direction).

Figure 10:
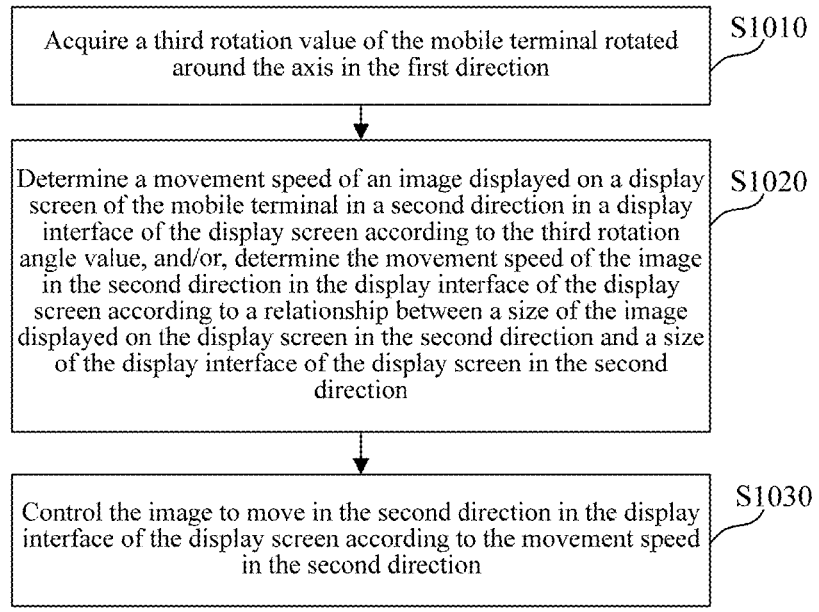
FIG. 10 schematically shows a flowchart of an image display method based on a mobile terminal according to yet another exemplary embodiment of the present disclosure.

In an exemplary embodiment, FIG. 10 schematically shows a flowchart of an image display method based on a mobile terminal according to yet another exemplary embodiment of the present disclosure, specifically, which provides the image display method for a case where a first size of the image in the first direction is greater than a first threshold (for example, the first threshold is a size of the display interface of the display screen in the first direction) and a second size of the image in the second direction is greater than a second threshold (for example, the second threshold is a size of the display interface of the display screen in the second direction). Specifically, this embodiment is based on the embodiment shown in FIG. 1.

Referring to FIG. 10, the method may include the following steps:

In the step S1010, a third rotation value of the mobile terminal rotated around the axis in the first direction is acquired.

In an exemplary embodiment, the rotation angel acquisition processor 401 is further configured to: acquire the third rotation angle value of the mobile phone rotated around an axis 91 in the first direction. Specifically, the third rotation angle value may be determined by the gyroscope and the acceleration sensor.

In the step S1020, the movement speed of the image displayed on the display screen of the mobile terminal in the second direction in the display interface of the display screen is determined according to the third rotation angle value, and/or, the movement speed of the image in the second direction in the display interface of the display screen is determined according to a relationship between a size of the image displayed on the display screen in the second direction and a size of the display interface of the display screen in the second direction.

In an exemplary embodiment, the movement speed processor 402 is further configured to: determine the movement speed of the image in the second direction according to the third rotation angle value of the mobile phone rotated around the axis 91 in the first direction.

In an exemplary embodiment, the three specific implementations for determining the movement speed in the step S1020 are the same as the embodiments corresponding to the step S120, and will not be described again.

In the step S1030, the image is controlled to move in the second direction in the display interface of the display screen according to the movement speed in the second direction.

In an exemplary embodiment, the image movement controller 403 is further configured to: control the image to move in the second direction in the display interface of the display screen according to the movement speed in the second direction.

In the technical solution provided by the embodiment shown in FIG. 10, while the rotation angle value around the axis 51 in the second direction is acquired and the area to be displayed in the first direction is determined in the embodiment shown in FIG. 1, the rotation angle value around the axis 91 in the first direction is also acquired, so as to determine the area to be displayed in the second direction. Therefore, the user may arbitrarily view each area of the image in all directions of the image, to meet the user's needs for viewing each area of the image when browsing the image in the way of somatosensory image browsing.

The specific implementation of each step of the embodiment shown in FIG. 10 will be described in more detail below. Similar to the embodiment shown in FIG. 1, the following embodiments still use the mobile phone as an example to describe the specific implementations of the technical solution.

Exemplarily, FIG. 9 shows a schematic diagram of a usage scenario according to another embodiment of the present disclosure. Referring to FIG. 9, a size of the image 900 in the X direction is greater than the short side of the display screen, and a size of the image 900 in the Y direction is greater than the long side of the display screen. When the image 900 is displayed on the display screen of the mobile phone in the manner shown in FIG. 9, each area of the image 900 may be displayed by rotating the mobile phone (the embodiment in which the rotation is around a direction parallel to the long side is the same as the embodiment shown in FIG. 1, and the embodiment in which the rotation is around a direction parallel to the short side is described below).

In an exemplary embodiment, in the step S1010, the gyroscope and the acceleration sensor are triggered to acquire the rotation angle value of the mobile terminal around the axis in the first direction. The first direction being parallel to the short side of the display screen is taken as an example for description, and then the second direction is a direction parallel to the long side of the display screen. The first threshold is determined according to the size of the short side of the display screen, and the second threshold is determined according to the size of the long side of the display screen.

That is, referring to FIG. 9, the gyroscope is triggered to acquire the rotation angle value of the mobile terminal around an axis (the axis 91 as shown in FIG. 9) parallel to the long side direction while acquiring the rotation angle value of the mobile terminal around an axis (the axis 51 as shown in FIG. 5) parallel to the short side direction. Further, based on the rotation angle value of rotating around the axis 51 and the rotation angle value of rotating around the axis 91, the image area dynamically displayed on the display screen is determined, and finally, a purpose of displaying the entire image 900 in the X-axis direction and in the Y-axis direction in the divided-area manner is achieved.

In an exemplary embodiment, in order to avoid that the rotation angle of the mobile terminal is too large to affect the user's experience of viewing the display screen, a third rotation angle threshold is an angle value not greater than 45 degrees.

In an exemplary embodiment, in a case provided by the step S1020 where the movement speed of the image in the second direction is determined according to the relationship between the size of the image displayed on the display screen in the second direction and the size of the display interface of the display screen in the second direction, specifically, according to a difference in size h2 (i.e., h2=y3−y4) between a size y3 (i.e., the second size) of the image 900 and a size y4 of the display interface in the second direction and the third rotation angle threshold, the movement speed of the image is determined when the mobile phone is rotated around the axis 91.

Exemplarily, the third rotation angle threshold represents a maximum value of rotating the mobile phone around the axis 91, and the value is β. Then, according to a ratio of the difference in size and the second rotation angle threshold, a specific implementation for determining the movement speed may be: λ2=(h2/β), which means that every time a display screen 90 of the mobile phone is rotated around the axis 91 by one degree, the image 900 moves (h2/β) in the long side direction of the display screen 90. In this embodiment, the movement speed of the image is automatically adjusted according to the size of the image, which is convenient for the user to view the complete image. When the size of the image is larger, the movement speed of the image is automatically adjusted to be faster to prevent the user from browsing for too long, so as to improve the user's somatosensory image browsing experience.

In an exemplary embodiment, while the second rotation angle value around the axis (e.g., the axis 51) parallel to the long side direction is acquired multiple times, by the image movement controller 403, the third rotation angle value around the axis (e.g., the axis 91) parallel to the short side direction is also acquired multiple times. The area to be displayed of the image in the X-axis direction of the image (including the positive X-axis direction and the negative X-axis direction) is determined according to the second rotation angle value acquired each time and the movement speed λ1 in the first direction, and the area to be displayed of the image may be further determined in the Y-axis direction of the of the image (including the positive direction of the Y-axis and the negative direction of the Y-axis) according to the third rotation angle value acquired each time and the movement speed λ2 in the second direction.

Figure 11:
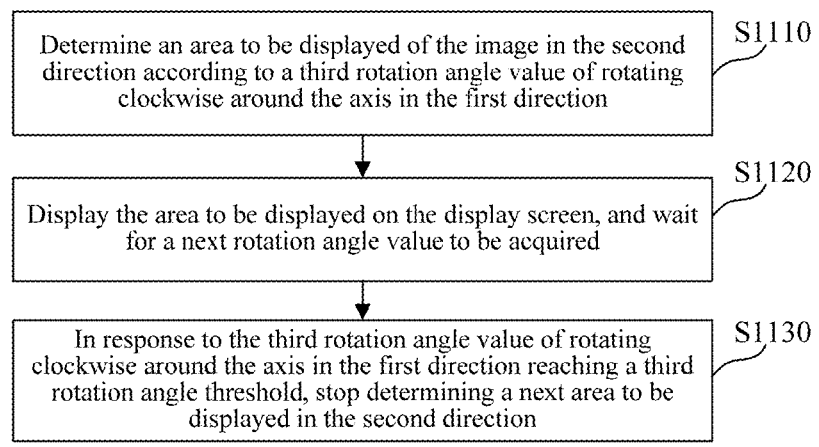
FIG. 11 schematically shows a flowchart of an image display method based on a mobile terminal according to an exemplary embodiment of the present disclosure.

Exemplarily, FIG. 11 schematically shows a flowchart of an image display method based on a mobile terminal according to an exemplary embodiment of the present disclosure, specifically, which is a specific implementation of the image display method for a clockwise direction around an axis 121 case. Referring to FIG. 11, the method provided in this embodiment includes steps S1110 to S1130.

In the step S1110, an area to be displayed of the image in the second direction is determined according to a third rotation angle value of rotating clockwise around the axis in the first direction.

Figure 12:
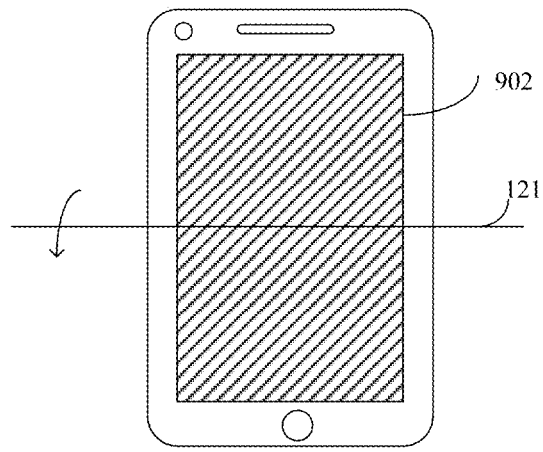
FIG. 12 shows a schematic diagram of a usage scenario according to an embodiment of the present disclosure.

In an exemplary embodiment, referring to FIG. 12, the mobile phone is rotated a certain angle (that is, the third rotation angle value) clockwise around the axis 121, and an area to be displayed of the image 900 in the positive Y-axis direction is determined. Exemplarily, the third rotation angle value of clockwise rotation is q, then the size of the area to be displayed of the image 900 in the positive Y-axis direction, is determined as q*λ2.

In the step S1120, the area to be displayed is displayed on the display screen, and a next rotation angle value is waited for to be acquired.

The above embodiment is still taken as an example for description. Referring to FIGS. 9 and 12, before the mobile phone is rotated around the axis 91, the image area displayed on the display screen 90 is an initial area 901, and after the mobile phone is rotated clockwise around the axis 121 by an angle q, the area to be displayed is determined as a middle area 902. Therefore, while the user rotates the mobile phone around the axis 51 to view various areas of the image in the X direction, the user may also view the various areas of the image in the Y direction by rotating the display screen of the mobile phone around the axis 121.

In the step S1030, in response to the third rotation angle value of rotating clockwise around the axis in the first direction reaching the third rotation angle threshold, determining a next area to be displayed in the second direction (that is, in the positive Y-axis direction) is stopped, so as to control the image to stop moving on the display screen.

In an exemplary embodiment, when the rotation angle value of rotating clockwise around the axis 121 reaches the third rotation angle threshold, at this time the display screen 90 displays a last area (i.e., a lowermost area 903) of the image 900 in the second direction. Therefore, the rotation angle value of the display screen around the axis 91 in the clockwise direction is no longer acquired, and the determination of the next area to be displayed in the second direction is stopped, thereby controlling the image 900 to stop moving on the display screen.

Figure 13:
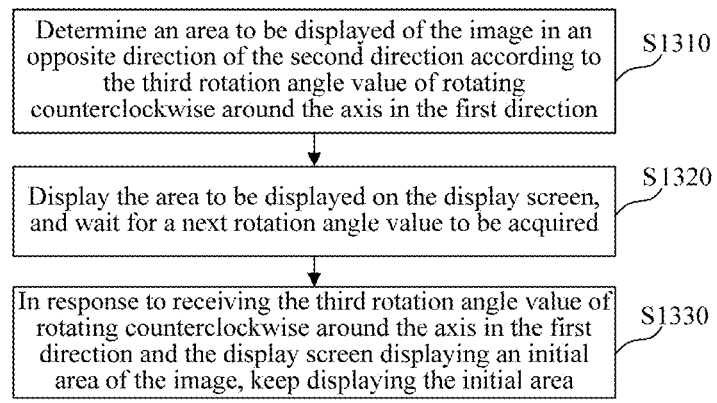
FIG. 13 schematically shows a flowchart of an image display method based on a mobile terminal according to another exemplary embodiment of the present disclosure.

Exemplarily, FIG. 13 schematically shows a flowchart of an image display method based on a mobile terminal according to another exemplary embodiment of the present disclosure, specifically, which is a specific implementation of the image display method for a counterclockwise direction around an axis 141 case. A difference from the embodiment shown in FIG. 11 is that the direction in which the mobile terminal is rotated around the axis 121 is opposite.

Referring to FIG. 13, the method provided in this embodiment includes steps S1310 to S1330.

In the step S1310, the area to be displayed of the image in an opposite direction of the second direction is determined according to the third rotation angle value of rotating counterclockwise around the axis in the first direction.

Figure 14:
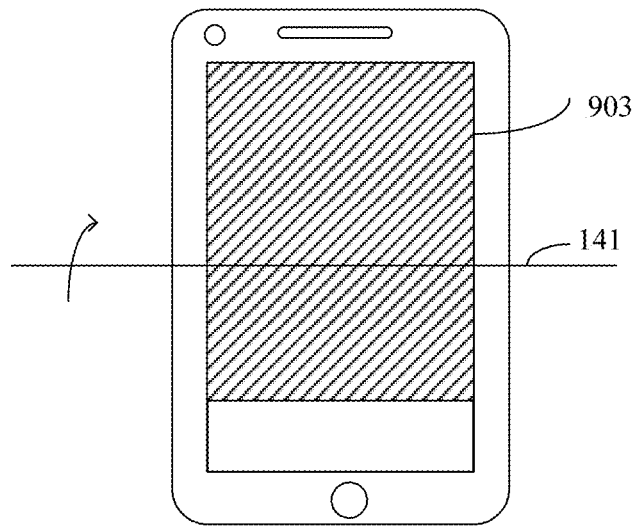
FIG. 14 schematically shows a usage scenario diagram according to another embodiment of the present disclosure.

In an exemplary embodiment, referring to FIG. 14, the mobile phone is rotated counterclockwise around the axis 141 (around the axis parallel to the short side direction) by a certain angle (that is, the second rotation angle value), then, an area to be displayed of the image 900 in a negative direction of the Y-axis is determined. Exemplarily, the third rotation angle of rotating counterclockwise is p, and the size of the area to be displayed of the image 900 in the negative Y-axis direction is determined as p*λ2.

In the step S1320, the area to be displayed is displayed on the display screen, and a next rotation angle value is waited for to be acquired.

The above embodiment is still taken as an example for description. Referring to FIGS. 12 and 14, when the middle area 902 is displayed on the display screen 90, after the mobile phone is rotated counterclockwise around the axis 141 by an angle p as shown in FIG. 14, the display area is determined as the initial area 901. Thus, the user may view each area of the image repeatedly by rotating the mobile phone back and forth.

In the step S1330, in response to receiving the second rotation angle value of rotating counterclockwise around the axis in the first direction, and when the display screen displays the initial area of the image, the initial area is kept displaying.

In the exemplary embodiment, with continued reference to FIG. 14, if the rotation angle value of rotating counterclockwise around the axis 141 is received, and the initial area 901 of the image is currently displayed on the display screen, it means that an uppermost area of the image is displayed at this time. Even if though the mobile terminal continues to be rotated counterclockwise around the axis 141, the image on the display screen will no longer change. Therefore, the initial area is kept displaying and the determination of the next area to be displayed in the first direction (that is, in the negative Y-axis direction) is stopped, to control the image to stop moving on the display screen.

In the embodiments shown in FIGS. 11 and 13, the determination of the image display area and a condition for stopping the determination of a next display area are introduced when the mobile phone is rotated clockwise/counterclockwise around the axis (around the axis in the second direction) parallel to the long side of the mobile phone, or when the mobile phone is rotated clockwise/counterclockwise around the axis (around the axis in the first direction) parallel to the short side of the mobile phone. Therefore, by the embodiments shown in FIGS. 11 and 13, the image of which the size in the Y-axis direction (refer to FIG. 9) is greater than the size of the short side of the display screen may be viewed by rotating the mobile phone. With the image display method provided in this embodiment, the user does not need to actively perform any traditional touch operation on the mobile phone, and may view the image beyond the display screen by simply rotating the mobile phone device.

In the above embodiment, by rotating the mobile terminal around the axis parallel to the long side/short side of the display screen, the user can view a part of the image beyond the size of the display screen. In the embodiments shown in FIGS. 15 and 16 below, based on the embodiment shown in FIG. 1, the rotation angle value generated by rotating the mobile terminal around an axis 161 (perpendicular to the display screen) is acquired to further display the part of the image beyond the size of the display screen based on the rotation angle value.

Figure 15:
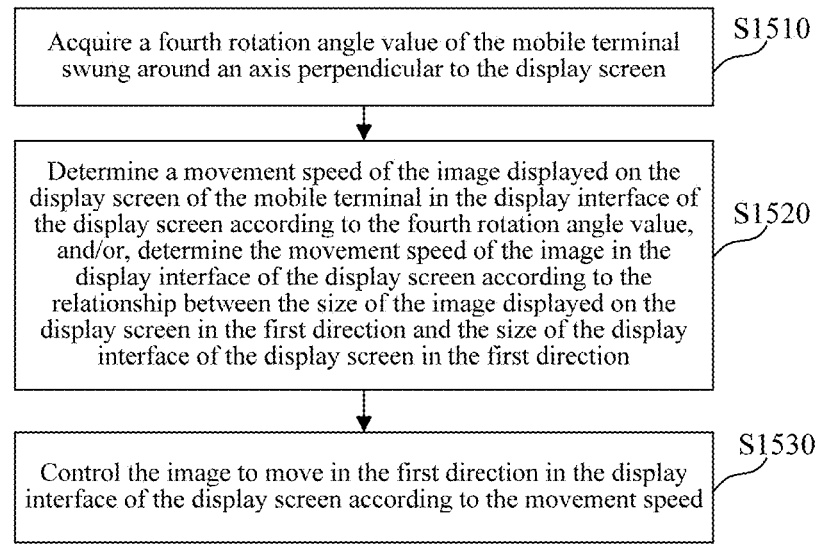
FIG. 15 schematically shows an image display method based on a mobile terminal according to still another exemplary embodiment of the present disclosure.

In an exemplary embodiment, FIG. 15 schematically shows a flowchart of an image display method based on a mobile terminal according to still another exemplary embodiment of the present disclosure. Specifically, this embodiment is the same as the embodiment shown in FIG. 1, and provides an image display method for a case where the first size of the image in the first direction is greater than the first threshold.

Referring to FIG. 15, the method may include steps S1510-S1530.

In the step S1510, a fourth rotation angle value of the mobile terminal swung around an axis perpendicular to the display screen is acquired.

In an exemplary embodiment, the rotation angel acquisition processor 401 is further configured to: acquire the fourth rotation angle value of the mobile phone swung around the axis 161 perpendicular to the display screen.

In the step S1520, the movement speed of the image displayed on the display screen of the mobile terminal in the display interface of the display screen is determined according to the fourth rotation angle value, and/or, the movement speed of the image in the display interface of the display screen is determined according to the relationship between the size of the image displayed on the display screen in the first direction and the size of the display interface of the display screen in the first direction.

In an exemplary embodiment, the movement speed processor 402 is further configured to: determine the movement speed of the image 200 in the first direction according to the fourth rotation angle value of the mobile phone swung around the axis 161 perpendicular to the display screen.

In the exemplary embodiment, the three specific implementations for determining the movement speed in the step S1520 are the same as the embodiments corresponding to the step S120, and will not be described again.

In the step S1530, the image is controlled to move in the first direction in the display interface of the display screen according to the movement speed.

In an exemplary embodiment, the image movement controller 403 is further specifically configured to: control the image 200 to move in the first direction in the display interface of the display screen according to the fourth rotation angle value and the movement speed in the first direction.

Similar to the embodiment shown in FIG. 1, the following embodiments still use the mobile phone as an example to describe the specific implementations of the technical solution. The specific implementation of each step in FIG. 15 is described below in conjunction with a usage scenario shown in FIG. 16.

In an exemplary embodiment, as described in the embodiment shown in FIG. 1, referring to FIGS. 2 and 5, when the size x1 (i.e., the first size) of the image 200 displayed on the display screen 20 in the X-axis direction is greater than the size x2 (i.e., the first threshold) of the short side of the display screen, the gyroscope and the acceleration sensor are triggered to acquire the rotation angle value of the mobile terminal rotated around the axis (the axis 51 shown in FIG. 5) parallel to the long side direction. In the step S1510 in the embodiment shown in FIG. 15, meanwhile, the fourth rotation angle value of the mobile terminal swung around the axis 161 perpendicular to the display screen may also be acquired by the gyroscope and the acceleration sensor.

Further, in the step S1520, according to the difference in size between the boundary of the image 200 in the first direction and the boundary of the display interface in the first direction and a fourth rotation angle threshold, the movement speed of the image in the first direction in the display interface is determined when the mobile terminal is swung around the axis 161.

Figure 16:
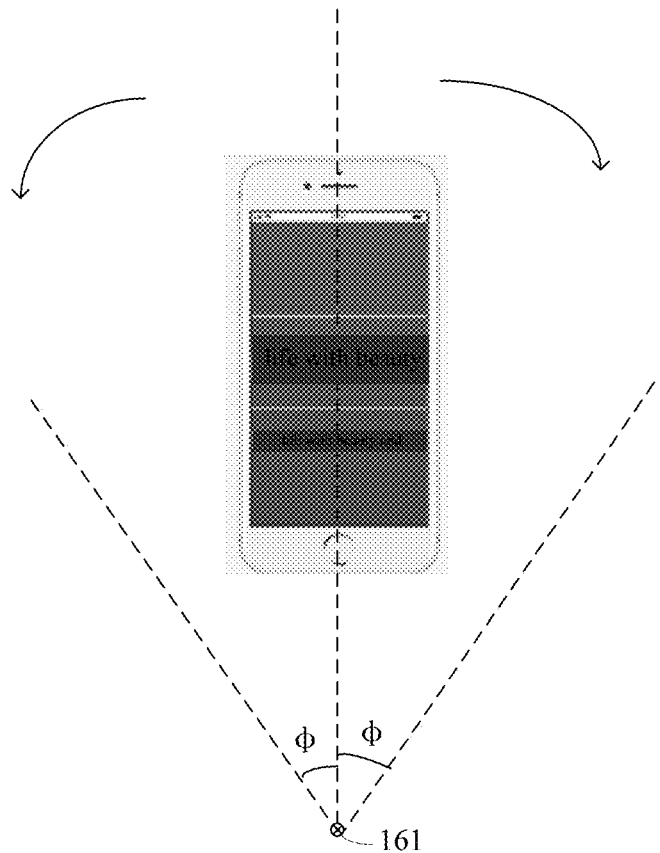
FIG. 16 schematically shows a usage scenario diagram according to yet another embodiment of the present disclosure.

In an exemplary embodiment, in order to avoid that the rotation angle value of the mobile terminal is too large to affect the user's experience of viewing the display screen, the present technical solution sets the fourth rotation angle threshold for the fourth rotation angle value. Exemplarily, the fourth rotation angle threshold for swinging to each side (as shown in FIG. 16, including swinging the mobile phone to the left and swinging the mobile phone to the right) is an angle value not greater than 90 degrees.

In tan exemplary embodiment, by the step S1520, according to the difference h1 (that is, h1=x1−x2) in size between the boundary x1 of the image 200 in the first direction and the boundary x2 of the display interface in the first direction and the fourth rotation angle threshold, the movement speed of the image in the first direction in the display interface is determined when the mobile terminal is swung around the axis 161. Exemplarily, the fourth rotation angle threshold represents a maximum value of swinging mobile phone to each side around the axis 161, and the value is φ, then the movement speed λ3 in the first direction may be expressed as [h1/(2φ)], which means that each time the mobile phone 20 is swung around the axis 141 by 1 degree, the image 200 moves [h1/(2φ)] in the short side direction of the display screen.

In an exemplary embodiment, by the image movement controller 403, the fourth rotation angle value of swinging around the axis 161 perpendicular to the display screen is acquired multiple times and the area to be displayed of the image 200 in the X-axis direction (including the positive X-axis direction and the negative X-axis direction) is determined according to the fourth rotation angle value acquired each time and the movement speed λ3 in the first direction. Exemplarily, if the mobile phone is swung to the right by an angle (such as the fourth rotation angle value) around the axis 161, the area to be displayed of the image 200 is determined in the positive X-axis direction. Exemplarily, if the fourth rotation angle value is k, then in the positive X-axis direction of the image 200, the size of the area to be displayed is determined as k*λ3.

Figure 17:
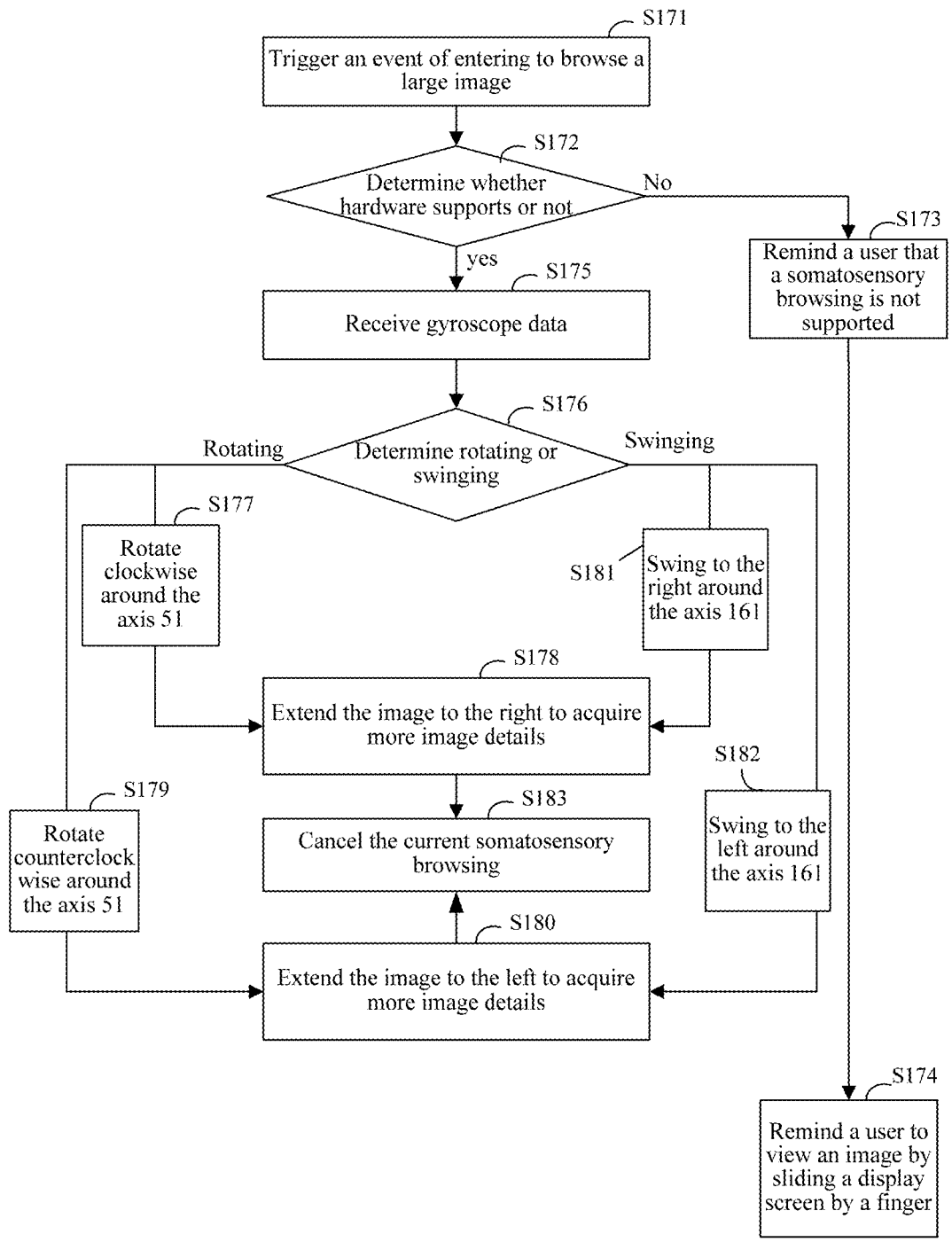
FIG. 17 schematically shows a flowchart of an image display method based on a mobile terminal according to an embodiment of the present disclosure.

In an exemplary embodiment, FIG. 17 shows a flowchart when a user views a large image (i.e., the image size exceeds the display screen size). Specifically, the embodiment shown in FIG. 17 is based on the embodiments shown in FIGS. 1 and 15.

Referring to FIG. 17, in step S171, an event of entering to browse a large image is triggered. In step S172, it is determined whether hardware of the mobile terminal supports a somatosensory browsing way provided by the technical solution. Exemplarily, if the mobile terminal is provided with the gyroscope and the acceleration sensor, the hardware of the mobile terminal supports the somatosensory browsing way provided by the technical solution. Otherwise, the hardware of the mobile terminal does not support the somatosensory browsing way provided by the technical solution.

If the hardware of the mobile terminal does not support the somatosensory browsing way provided by the technical solution, steps S173 and S174 are directly executed.

In the step S173, the user is reminded that the mobile terminal does not support the somatosensory browsing way provided by the technical solution. And, in the step S174, the user is reminded to browse the image by sliding the display screen by a finger.

In a case where the hardware of the mobile terminal supports the somatosensory browsing way provided by the technical solution, steps S175 and S176 are executed.

In the step S175, based on the received gyroscope data, and in the step S176, it is determined whether the mobile terminal is rotated around the axis 51 (refer to FIG. 5) or swung around the axis 161 (refer to FIG. 16).

In a case where the mobile terminal is rotated around the axis 51 (refer to FIG. 5), if step S177 is executed: the mobile terminal is rotated clockwise around the axis 51 (refer to FIG. 5), step S178 is further executed: the image is extended to the right to acquire more image details; if step S179 is executed: the mobile terminal is rotated counterclockwise around the axis 51 (refer to FIG. 8), step S180 is further executed: the image is extended to the left to acquire more image details.

In a case where the mobile terminal is swung around the axis 161 (refer to FIG. 16), if step S181 is executed: the mobile terminal is swung to the right around the axis 161 (refer to FIG. 16), step S178 is further executed: the image is extended to the right to acquire more image details; if step S182 is executed: the mobile terminal is swung to the left around the axis 161 (refer to FIG. 16), step S178 is further executed: the image is extended to the left to acquire more image details.

In an exemplary embodiment, during the process of executing the step S178 to extend the image to the right to acquire more image details, or during the process of executing the step S180 to extend the image to acquire more image details, the user may cancel the somatosensory browsing way provided by the technical solution through a preset touch operation (that is, step S183 is executed). The above-mentioned preset touch operation may be clicking an image.

In this embodiment, the image browsing experience may be achieved by swinging the mobile terminal, or the image browsing experience may be achieved by rotating the mobile terminal, which provides the user with a variety of operation methods, which is beneficial to enhance the image browsing experience.

Figure 4:
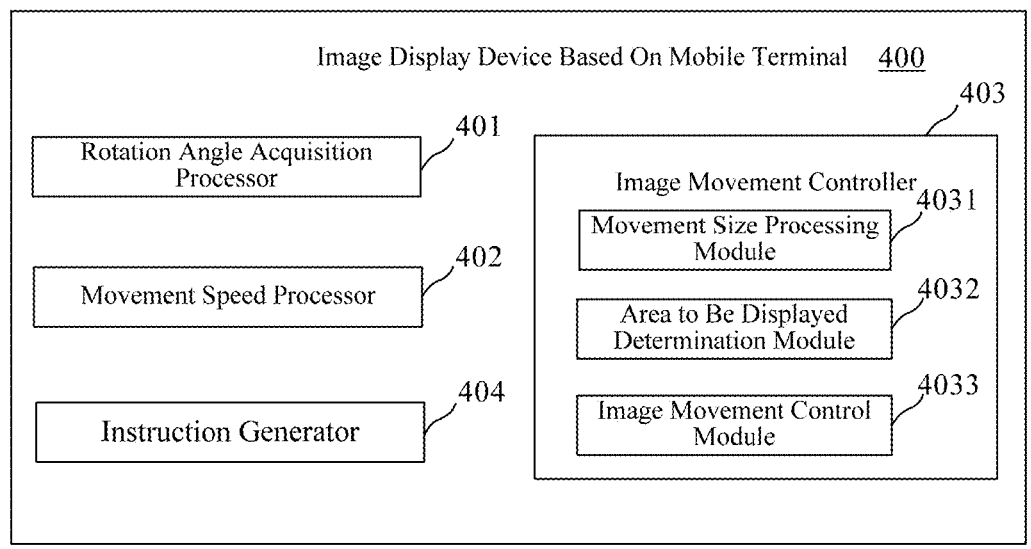
FIG. 4 schematically shows a structural diagram of an image display device based on a mobile terminal according to an exemplary embodiment of the present disclosure.

In an exemplary embodiment, referring to FIG. 4, a display device based on a mobile terminal provided in this embodiment further includes: an instruction generator 404.

Exemplarily, in response to the image movement controller 403 controlling the image to move in the display interface of the display screen (the movement of the image in the display interface in the embodiments shown in FIG. 1, FIG. 10 or FIG. 15), in this embodiment, the instruction generator 404 may be configured to generate an instruction for controlling a display terminal to display the image. Exemplarily, the display terminal may include a display interface with a larger size, so that the user may browse the image by the larger display interface, for example, a paint plate terminal.

In an exemplary embodiment, referring to FIG. 3, the instruction generated by the instruction generator 404 include: information for controlling the display terminal (the paint plate terminal 31) to display the current image area in the display interface of the mobile terminal. That is, the screen displayed in the display interface of the mobile terminal is displayed synchronously to the display interface of the display terminal.

In an exemplary embodiment, the instruction generated by the instruction generator 404 further include: using to control the image displayed in the display terminal (the paint plate terminal 31) to move in the first direction. That is, a moving screen of the display interface of the mobile terminal is dynamically synchronized to the display interface of the display terminal.

Therefore, this embodiment provides the way of somatosensory image browsing on the display terminal (the paint plate terminal 31), which improves the user's enjoyment of browsing images on the display terminal (the paint plate terminal 31).

In an exemplary embodiment, after the browsing through the somatosensory browsing way provided by the present technical solution is completed, the somatosensory browsing way provided by the present technical solution may be exited by a returning control.

Those skilled in the art may understand that rotation angle acquisition processor 401, the movement speed processor 402, the image movement controller 403, and the instruction generator 404 in the image display device based on the mobile terminal may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components to achieve the image display method based on the mobile terminal.

Those skilled in the art may understand that all or part of the steps for implementing the above-described embodiments are implemented as computer programs executed by a processor (including a CPU/GPU). When the computer program is executed by the CPU/GPU, the above function defined by the above method provided by the present disclosure is executed. The program may be stored in a non-transitory computer-readable storage medium, and the non-transitory computer-readable storage medium may be a read-only memory, a magnetic disk, or an optical disk, for example.

In addition, it should be noted that the above-mentioned drawings are only schematic illustrations of processes included in the method according to the exemplary embodiment of the present disclosure, and are not intended to limit the purpose. It is understood that the processes shown in the above drawings do not indicate or limit the chronological order of these processes. In addition, for example, it is also understood that these processes may be performed synchronously or asynchronously in multiple modules.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

Those skilled in the art may understand that various aspects of the present invention may be implemented as a system, method, or program product. Therefore, various aspects of the present invention may be embodied in the following forms: a complete hardware implementation, a complete software implementation (including firmware, microcode, etc.), or a combination of hardware and software, which may be collectively referred to herein 'circuit', 'module', or 'system'.

In some embodiments of the present disclosure, there is also provided a computer-readable storage medium on which a program product capable of implementing the above-mentioned method of the present specification is stored. In some possible implementation manners, aspects of the present invention may also be implemented in the form of a program product, which comprises program code. When the program product runs on a terminal device, the program code is used to make the terminal device perform the steps according to various exemplary embodiments of the present invention described in the above-mentioned "exemplary method" section of this specification.

Figure 18:
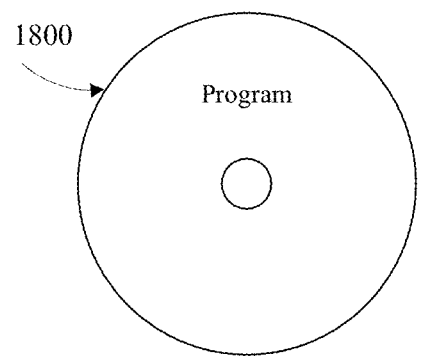
FIG. 18 schematically shows a computer-readable storage medium for implementing the above image display method based on the mobile terminal.

Referring to FIG. 18, a program product 1800 for implementing the above method according to an embodiment of the present invention is described. The program product 1800 can use a portable compact disc read-only memory (CD-ROM) and include the program code, which may run on a terminal device, for example, personal computer. However, the program product of the present invention is not limited thereto. In this document, the readable storage medium may be tangible medium containing or storing program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media comprise: electrical connection with one or more wires, portable disk, hard disk, random access memory (RAM), read-only memory (ROM), erasable programmable read-only memory (EPROM or flash memory), optical fiber, portable compact disc read-only memory (CD-ROM), optical storage device, magnetic storage device, or any suitable combination of the foregoing.

The computer-readable signal medium may comprise a data signal in baseband or propagated as a part of a carrier wave, which carries readable program code. Such a propagated data signal may take many forms, comprising but not limited to electromagnetic signals, optical signals, or any suitable combination of the foregoing. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, comprising but not limited to wireless, wired, optical cable, RF, etc., or any suitable combination of the foregoing.

The program code for performing the operations of the present invention may be written in any combination of one or more programming languages, which comprise object-oriented programming languages, such as Java, C++, etc. and further comprise conventional procedural programming language, such as 'C' or a similar programming language. The program code may be executed entirely or partly on the user computing device, may be executed as an independent software package, may be executed partly on the user computing device and partly on the remote computing device, or may be executed entirely on the remote computing device or server. In the case of involving remote computing devices, the remote computing devices may be connected to the user computing device via any kind of network, such as a local area network (LAN) or a wide area network (WAN), or it may be connected to external computing devices, for example, connected to external computing devices via the Internet by use of an Internet service provider.

In some embodiments of the present disclosure, an electronic device capable of implementing the above method is further provided.

An electronic device 1900 according to this embodiment of the present disclosure is described below with reference to FIG. 19. The electronic device 1900 shown in FIG. 19 is only an example, and should not bring any limitation to the functions and use scope of the embodiments of the present disclosure.

Figure 19:
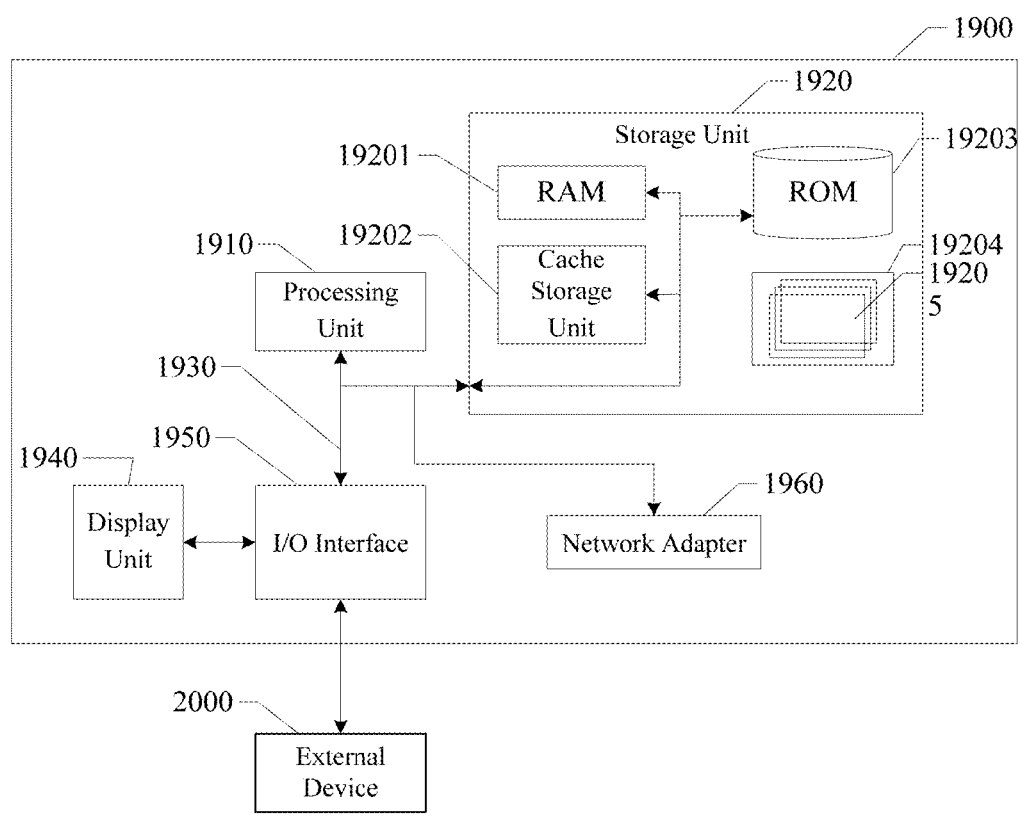
FIG. 19 schematically shows an example block diagram of an electronic device for implementing the above image display method based on the mobile terminal.

As shown in FIG. 19, the electronic device 1900 is expressed in the form of a general-purpose computing device. The components of the electronic device 1900 may comprise, but are not limited to, at least one processing unit 1910, at least one storage unit 1920, and a bus 1930 connecting different system components (including the storage unit 1920 and the processing unit 1910).

In the example above, the storage unit stores program codes, and the program codes may be executed by the processing unit 1910, so that the processing unit 1910 executes various steps of the exemplary embodiments according to the present invention described in the above-mentioned 'exemplary method' in the specification. For example, the processing unit 1910 may execute the step S110 as shown in FIG. 1: acquiring a rotation angle value of the mobile terminal rotated around an axis in a second direction; the step S120: determining a movement speed of an image displayed on a display screen of the mobile terminal in a display interface of the display screen according to the rotation angle value, and/or, determining the movement speed of the image in the display interface of the display screen according to a relationship between a size of the image displayed on the display screen in a first direction and a size of the display interface of the display screen in the first direction; and the step S130: controlling the image to move in the first direction in the display interface of the display screen according to the movement speed and the first direction and the second direction are substantially perpendicular.

The storage unit 1920 may comprise a readable medium in the form of a volatile storage unit, such as a random access storage unit (RAM) 19201 and/or a cache storage unit 19202, and may further comprise a read-only storage unit (ROM) 19203.

The storage unit 1920 may further comprise a program/utility tool 19204 having a set of (at least one) program modules 19205. Such program modules 19205 comprise, but are not limited to, an operating system, one or more application programs, other program modules, and program data. Each or some combination of these examples may comprise an implementation of a network environment.

The bus 1930 may be one or more of several types representing bus structures, comprising a storage unit bus or a storage unit controller, a peripheral bus, a graphics acceleration port, a processing unit, or a local bus that uses any bus structure in a variety of bus structures.

The electronic device 1900 may also communicate with one or more external devices 2000 (such as a keyboard, pointing device, Bluetooth® device, etc.), may also communicate with one or more devices that enable a user to interact with the electronic device 1900, and/or with any device (e.g., router, modem, etc.) that enables the electronic device 1900 to communicate with one or more other computing devices. This communication may be performed through an input/output (I/O) interface 1950. Moreover, the electronic device 1900 may also communicate with one or more networks (such as a local area network (LAN), a wide area network (WAN), and/or a public network, such as the Internet) through the network adapter 1960. As shown, the network adapter 1960 communicates with other modules of the electronic device 1900 through the bus 1930. It should be understood that although not shown in the figure, other hardware and/or software modules may be used in conjunction with the electronic device 1900, comprising but not limited to: microcode, device drivers, redundant processing units, external disk drive arrays, RAID systems, tape drives, data backup storage systems and the like.

Through the description of the above embodiments, those skilled in the art will readily understand that the exemplary embodiments described here may be implemented by software or by software in combination with necessary hardware. Therefore, the technical solution according to the embodiments of the present disclosure may be embodied in a form of software product, which may be stored in a non-volatile storage medium (which may be a CD-ROM, a USB disk, a mobile hard disk, etc.) or on a network, including a number of instructions to make a computing device (which may be a personal computer, a server, a terminal apparatus, or a network device, etc.) to perform the methods according to embodiments in the present disclosure.

Other embodiments of the present disclosure will be apparent to those skilled in the art after consideration of the specification and practice of the present disclosure disclosed here. The present application is intended to cover any variations, uses, or adaptations of the present disclosure, which are in accordance with the general principles of the disclosure and include common general knowledge or common technical means in the art that are not disclosed in the present disclosure. The specification and embodiments are deemed to be exemplary only and the true scope and spirit of this disclosure is indicated by the claims.

What is claimed is:

1. An image display device based on a mobile terminal, comprising:
    a rotation angle acquisition processor configured to acquire a rotation angle value of the mobile terminal swung around an axis in a direction perpendicular to a display surface of a display screen of the mobile terminal in response to a size of an image displayed on the display screen of the mobile terminal in a first direction being greater than a size of a display interface of the display screen in the first direction;
    a movement speed processor configured to determine a first sub-movement speed, in the first direction, of the image displayed on the display screen of the mobile terminal in the display interface of the display screen according to the rotation angle value, determine a second sub-movement speed in the first direction according to a ratio of a difference in size between a boundary of the image in the first direction and a boundary of the display interface in the first direction to a second rotation angle threshold, and obtain a final movement speed, in the first direction, of the image displayed on the display screen of the mobile terminal in the display interface of the display screen by weighting and summing the first sub-movement speed and the second sub-movement speed, wherein the first sub-movement speed, the second sub-movement speed and the final movement speed respectively represent movement distances in the first direction per unit rotation angle of the mobile terminal; and
    an image movement controller configured to control the image to move in the first direction in the display interface of the display screen according to the final movement speed and the rotation angle value;
    wherein the movement controller is further configured to stop somatosensory browsing of the image in response to a touch control from a user.

2. The image display device according to claim 1, wherein the image movement controller is further configured to:

determine a movement size of the image in the first direction according to the final movement speed and the rotation angle value;

determine an area to be displayed of the image in the first direction according to the movement size; and control the image to move in the first direction in the display interface of the display screen, by displaying the area to be displayed on the display screen.

3. The image display device according to claim 2, wherein:

the rotation angle acquisition processor is further configured to acquire a rotation direction of the mobile terminal around the axis in the direction perpendicular to the display surface of the display screen of the mobile terminal;

the image movement controller is further configured to determine a movement direction of the image according to the rotation direction; and the rotation direction comprises a clockwise direction around the direction perpendicular to the display surface of the display screen of the mobile terminal and a counterclockwise direction around the direction perpendicular to the display surface of the display screen of the mobile terminal.

4. The image display device according to claim 3, wherein the image movement controller is further configured to:

in response to the rotation angle value of the mobile terminal rotated around the axis in the direction perpendicular to the display surface of the display screen of the mobile terminal reaching the second rotation angle threshold, control the image to stop moving in the first direction in the display interface of the display screen, by stopping determining a next area to be displayed in the first direction.

5. The image display device based according to claim 1, wherein:

the first direction is parallel to a first side of the display screen; or the first direction is parallel to a second side of the display screen.

6. The image display device according to claim 1, wherein:

the rotation angle acquisition processor is further configured to acquire a third rotation angle value of the mobile terminal rotated around the axis in the first direction;

the movement speed processor is further configured to perform at least one of:

determine a movement speed of the image displayed on the display screen of the mobile terminal in a second direction in the display interface of the display screen according to the third rotation angle value; and determine the movement speed of the image in the second direction in the display interface of the display screen according to a relationship between a size of the image displayed on the display screen in the second direction and a size of the display interface of the display screen in the second direction; and the image movement controller is further configured to control the image to move in the second direction in the display interface of the display screen according to the movement speed in the second direction, wherein the first direction and the second direction are substantially perpendicular.

7. The image display device according to claim 1, further comprising an instruction generator configured to, in response to the image being controlled to move in the display interface of the display screen by the image movement controller, generate an instruction for controlling a display terminal to display the image.

8. The image display device according to claim 7, wherein the instruction comprises information of a current image area displayed in the display interface of the display screen so that the current image area is displayed by the display terminal.

9. The image display device according to claim 7, wherein the instruction is configured to control the image displayed in the display terminal to move in the first direction.

10. An image display method based on a mobile terminal, comprising:

acquiring a rotation angle value of the mobile terminal swung around an axis in a direction perpendicular to a display surface of a display screen of the mobile terminal in response to a size of an image displayed on the display screen of the mobile terminal in a first direction being greater than a size of a display interface of the display screen in the first direction;

determining a first sub-movement speed, in the first direction, of the image displayed on the display screen of the mobile terminal in the display interface of the display screen according to the rotation angle value, determining a second sub-movement speed in the first direction according to a ratio of a difference in size between a boundary of the image in the first direction and a boundary of the display interface in the first direction to a second rotation angle threshold, and obtaining a final movement speed, in the first direction, of the image displayed on the display screen of the mobile terminal in the display interface of the display screen by weighting and summing the first sub-movement speed and the second sub-movement speed, wherein the first sub-movement speed, the second sub-movement speed and the final movement speed represent movement distances in the first direction per unit rotation angle of the mobile terminal; and controlling the image to move in the first direction in the display interface of the display screen according to the final movement speed and the rotation angle value;

wherein the movement controller is further configured to stop somatosensory browsing of the image in response to a touch control from a user.

11. The image display method according to claim 10, further comprising, in response to the controlling the image to move in the display interface of the display screen, generating an instruction for controlling a display terminal to display the image.

12. An electronic device, comprising:

at least one hardware processor; and a memory storing program instructions that, when executed by the at least one hardware processor, implement an image display method based on a mobile terminal wherein the image display method comprises:

acquiring a rotation angle value of the mobile terminal swung around an axis in a direction perpendicular to a display surface of a display screen of the mobile terminal in response to a size of an image displayed on the display screen of the mobile terminal in a first direction being greater than a size of a display interface of the display screen in the first direction;

determining a first sub-movement speed, in the first direction, of the image displayed on the display screen of the mobile terminal in the display interface of the display screen according to the rotation angle value, determining a second sub-movement speed in the first direction according to a ratio of a difference in size between a boundary of the image in the first direction and a boundary of the display interface in the first direction to a second rotation angle threshold, and obtaining a final movement speed, in the first direction, of the image displayed on the display screen of the mobile terminal in the display interface of the display screen by weighting and summing the first sub-movement speed and the second sub-movement speed, wherein the first sub-movement speed, the second sub-movement speed and the final movement speed represent movement distances in the first direction per unit rotation angle of the mobile terminal; and controlling the image to move in the first direction in the display interface of the display screen according to the final movement speed and the rotation angle value;

wherein the movement controller is further configured to stop somatosensory browsing of the image in response to a touch control from a user.

13. The image display method according to claim 10, wherein the image display method is performed by at least one hardware processor through execution of a computer program stored on a non-transitory computer-readable medium.

\* \* \* \* \*